United States Patent
Neelakantamurthy et al.

(10) Patent No.: US 11,864,276 B2
(45) Date of Patent: *Jan. 2, 2024

(54) ENRICHMENT OF MONITORING USER PLANE DATA USING PFCP MONITORING

(71) Applicant: NetScout Systems, Inc., Westford, MA (US)

(72) Inventors: Yashovan B. Neelakantamurthy, Los Gatos, CA (US); Antoni Stanislaw Banach, San Jose, CA (US); Abhishek Saraswati, Santa Clara, CA (US); Tauras Liubinskas, Lexington, KY (US); Shilpa Bansod, San Jose, CA (US); Ming Tong Entlinger, Fremont, CA (US); Daniel Andrew Hill, Murphy, TX (US)

(73) Assignee: Netscout Systems, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,968

(22) Filed: Mar. 3, 2023

(65) Prior Publication Data
US 2023/0209653 A1 Jun. 29, 2023

Related U.S. Application Data

(63) Continuation of application No. 17/474,996, filed on Sep. 14, 2021, now Pat. No. 11,602,009.
(Continued)

(51) Int. Cl.
*H04W 80/06* (2009.01)
*H04W 76/12* (2018.01)
(Continued)

(52) U.S. Cl.
CPC ........... *H04W 80/06* (2013.01); *H04W 12/72* (2021.01); *H04W 48/18* (2013.01); *H04W 76/11* (2018.02); *H04W 76/12* (2018.02); *H04W 84/042* (2013.01)

(58) Field of Classification Search
CPC ..... H04W 80/06; H04W 12/72; H04W 48/18; H04W 76/11; H04W 76/12; H04W 84/042
See application file for complete search history.

(56) References Cited

U.S. PATENT DOCUMENTS

| 8,644,762 B1 * | 2/2014 | Liubinskas ........... H04W 24/08 |
| | | 455/41.2 |
| 10,243,732 B1 | 3/2019 | Herzerg et al. |
| | (Continued) | |

OTHER PUBLICATIONS

Park, Seongmin, et al. "Session Management for Security Systems in 5G Standalone Network." IEEE Access 10 (2022): 73421-73436. (Year: 2022).*

(Continued)

*Primary Examiner* — Sharad Rampuria
(74) *Attorney, Agent, or Firm* — Foley & Lardner LLP

(57) ABSTRACT

An illustrative embodiment disclosed herein is a non-transitory computer readable medium. In some embodiments, the medium includes instructions for providing a mobile user monitoring solution that, when executed by a processor, cause the processor to capture a first message transmitted over a packet forwarding control protocol (PFCP) interface, extract a permanent ID and a first user plane tunnel endpoint identifier (TEID) from the first message, store the permanent ID and the first user plane TEID in a PFCP protocol data unit (PDU) session record, store the permanent ID in a session details record, capture a second message transmitted over a user plane interface after the first message is transmitted, extract a second user plane TEID from the second message, (Continued)

wherein the second user plane TEID matches the first user plane TEID, and retrieve the session details record using the second user plane TEID.

20 Claims, 7 Drawing Sheets

Related U.S. Application Data

(60) Provisional application No. 63/223,817, filed on Jul. 20, 2021.

(51) Int. Cl.
*H04W 48/18* (2009.01)
*H04W 76/11* (2018.01)
*H04W 84/04* (2009.01)
*H04W 12/72* (2021.01)

(56) References Cited

U.S. PATENT DOCUMENTS

| | | |
|---|---|---|
| 11,456,961 B1 | 9/2022 | Mui et al. |
| 2002/0078150 A1 | 6/2002 | Thompson et al. |
| 2005/0216595 A1 | 9/2005 | Miyata et al. |
| 2011/0320608 A1 | 12/2011 | Nelakonda et al. |
| 2013/0301611 A1* | 11/2013 | Baghel .................. H04L 63/123 370/329 |
| 2014/0195899 A1 | 7/2014 | Bastide et al. |
| 2016/0028607 A1 | 1/2016 | Weill et al. |
| 2017/0195486 A1 | 7/2017 | Li et al. |
| 2020/0280511 A1 | 9/2020 | Gapin et al. |
| 2022/0104308 A1* | 3/2022 | Talebi Fard ............ H04W 4/90 |
| 2023/0007473 A1 | 1/2023 | Muthuchamy et al. |
| 2023/0025738 A1 | 1/2023 | Neelakantamurthy et al. |
| 2023/0029167 A1 | 1/2023 | Neelakantamurthy et al. |
| 2023/0036645 A1* | 2/2023 | Qiao ..................... H04W 76/12 |

OTHER PUBLICATIONS

A method for transferring between communication systems and related device; CN-111629411-A (Year: 2020).

Data transmission method and electronic device; CN-112436998-A (Year: 2021).

Extended wireless device battery life in method; CN-102239731-A (Year: 2011).

Intelligent SIM selection of rich context of supporting input factor; CN-105453596-B (Year: 2019).

Multimodal Session Support On Distinct Multi Channel Protocol; CA-2453583-C (Year: 2002).

\* cited by examiner

From FIG. 3A

Extract (a) a permanent ID from one of the establishment request message, the establishment response message, the first message, or the second message, (b) an uplink (UL) general packet radio service (GPRS) tunneling protocol (GTP)-user plane (U) tunnel endpoint identifier (TEID) from a packet detection rule (PDR) of one of the establishment request message, the establishment response message, the first message, or the second message, and (c) a downlink (DL) GTP-U TEID from a forwarding action rule (FAR) of one of the establishment request message, the establishment response message, the first message, or the second message. 318

Store the first key, the third key, permanent ID, the UL GTP-U TEID, and the DL GTP-U TEID in a PFCP protocol data unit (PDU) session record. 320

Store the permanent ID in a session details record. 322

Capture a third message transmitted over the user plane interface. 324

Extract a first GTP-U TEID from the third message, wherein the first GTP-U TEID matches one of the UL GTP-U TEID or the DL GTP-U TEID. 326

Retrieve the session details record using the first GTP-U TEID. 328

ENRICHMENT OF MONITORING USER PLANE DATA USING PFCP MONITORING

CROSS-REFERENCE TO RELATED APPLICATION

This application claims benefit of priority as a continuation to U.S. application Ser. No. 17/474,996, filed Sep. 14, 2021, titled "ENRICHMENT OF MONITORING USER PLANE DATA USING PFCP MONITORING," which claims priority to U.S. Provisional Patent Application No. 63/223,817, filed Jul. 20, 2021, titled "ENRICHMENT OF MONITORING USER PLANE DATA USING PFCP MONITORING," the entire contents of each of which are incorporated by reference herein for all purposes.

BACKGROUND

The 5G Core aggregates data traffic from end devices. The 5G Core also authenticates subscribers and devices, applies personalized policies and manages the mobility of the devices before routing the traffic to operator services or the Internet. The 5G Core and its predecessor, the Evolved Core Packet (EPC), are different in that the 5G Core is decomposed into a number of Service-Based Architecture (SBA) elements and is designed from the ground-up for complete control and user plane separation. Rather than physical network elements, the 5G Core comprises software-based network functions.

SUMMARY

Aspects of the present disclosure relate generally to a communications network, and more particularly to a system, apparatus, and method for monitoring a user plane interface.

In some embodiments, a non-transitory computer readable medium is disclosed. In some embodiments, the medium includes instructions for providing a mobile user monitoring solution that, when executed by a processor, cause the processor to capture a first message transmitted over a packet forwarding control protocol (PFCP) interface, extract a permanent ID and a first user plane tunnel endpoint identifier (TEID) from the first message, store the permanent ID and the first user plane TEID in a PFCP protocol data unit (PDU) session record, store the permanent ID in a session details record, capture a second message transmitted over a user plane interface after the first message is transmitted, extract a second user plane TEID from the second message, wherein the second user plane TEID matches the first user plane TEID, and retrieve the session details record using the second user plane TEID.

In some embodiments, the medium includes instructions for providing a mobile user monitoring solution that, when executed by a processor, further cause the processor to retrieve the session details record using the second user plane TEID by retrieving the permanent ID from the PFCP PDU session record using the second user plane TEID and retrieving the session details record using the permanent ID.

In some embodiments, the medium includes instructions for providing a mobile user monitoring solution that, when executed by a processor, further cause the processor to extract session details from the second message and store the session details in the session details record.

In some embodiments, the session details record include two or more of network information, session information, user information, or a user location.

In some embodiments, the network information includes one or more of a client internet protocol (IP) address, a service IP address, a service/data network name (DNN), the session information includes one or more of the DNN, a radio access technology (RAT) type, or a quality of service (QoS), the user information includes one or more of a subscriber permanent identifier (SUPI), a permanent equipment identifier (PEI), a general public subscription identifier (GPSI), subscriber IP addresses, a mobile subscriber international integrated services digital network (MSISDN) number, or a mobile equipment identity (MEI), and the user location includes one or more of a tracking area code (TAC), a cell area, or a public land mobile network (PLMN).

In some embodiments, the first message is one or more of a PFCP session establishment request, a PFCP session establishment response, a PFCP modify request, or a PFCP modify response.

In some embodiments, the permanent ID is one of a subscriber permanent identifier (SUPI) or a permanent equipment identifier (PEI).

In some embodiments, each of the first user plane TEID and the second user plane TEID is a general packet radio service (GPRS) tunneling protocol (GTP)-user plane(U) TEID.

In some embodiments, an apparatus is disclosed. In some embodiments, the apparatus includes a processor and a memory. In some embodiments, the memory includes programmed instructions that, when executed by the processor, cause the apparatus to capture a first message transmitted over a packet forwarding control protocol (PFCP) interface, extract a permanent ID and a first user plane tunnel endpoint identifier (TEID) from the first message, store the permanent ID and the first user plane TEID in a PFCP protocol data unit (PDU) session record, store the permanent ID in a session details record, capture a second message transmitted over a user plane interface after the first message is transmitted, extract a second user plane TEID from the second message, wherein the second user plane TEID matches the first user plane TEID, and retrieve the session details record using the second user plane TEID.

In some embodiments, the memory includes programmed instructions that, when executed by a processor, further cause the apparatus to retrieve the session details record using the second user plane TEID by retrieving the permanent ID from the PFCP PDU session record using the second user plane TEID and retrieving the session details record using the permanent ID.

In some embodiments, the memory includes programmed instructions that, when executed by a processor, further cause the apparatus to extract session details from the second message and store the session details in the session details record.

In some embodiments, a method is disclosed. In some embodiments, the method includes capturing a first message transmitted over a PFCP interface, extracting a permanent ID and a first user plane tunnel endpoint identifier (TEID) from the first message, storing the permanent ID and the first user plane TEID in a packet forwarding control protocol (PFCP) protocol data unit (PDU) session record, storing the permanent ID in a session details record, capturing a second message transmitted over a user plane interface, extracting a second user plane TEID from the second message after the first message is transmitted, wherein the second user plane TEID matches the first user plane TEID, and retrieving the session details record using the second user plane TEID.

In some embodiments, the method further includes retrieving the permanent ID from the PFCP PDU session record using the second user plane TEID and retrieving the session details record using the permanent ID.

In some embodiments, the method further includes extracting session details from the second message and storing the session details in the session details record.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3A and 3B are a flow chart of an example method for associating a user with a general packet radio service (GPRS) tunneling protocol (GTP)-user plane (U) tunnel, in accordance with some embodiments.

Figure 1A:
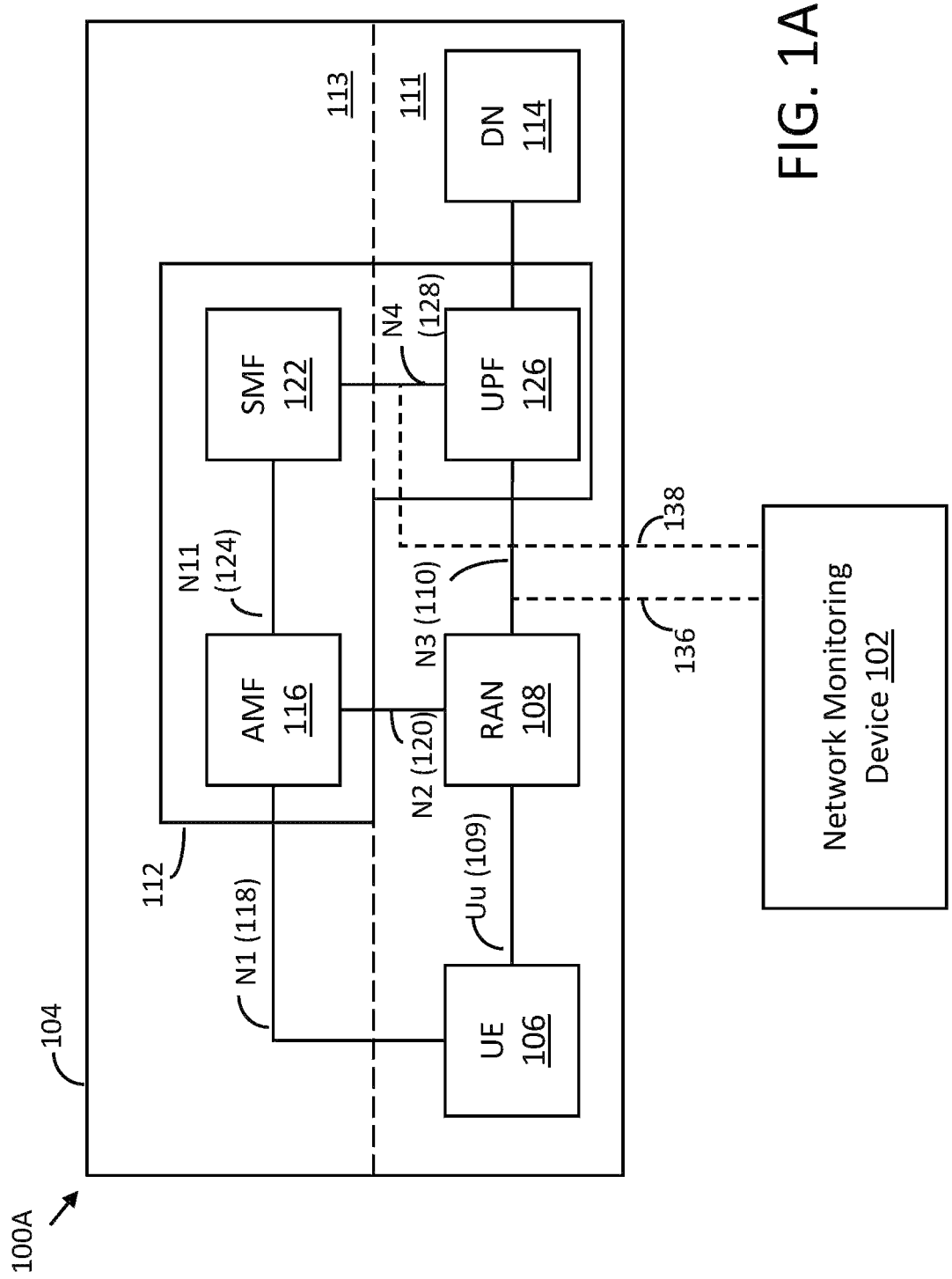
FIG. 1A is a block diagram of an environment for monitoring a 5G network, in accordance with some embodiments.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Monitoring subscriber data with enriched data at a user plane is challenging since the user plane and the control plane may not be co-located. Therefore, the normal control information that is monitored (e.g., the S11, S5/S8, or N11 interfaces) to enrich the data from the tunnels may not be available without having to backhaul data to some other location.

There are a various challenges in monitoring subscriber sessions using a packet forwarding control protocol (PFCP) and correlating and enriching the data going through the user plane including tracking a subscriber session using PFCP, managing and maintaining general packet radio service (GPRS) tunneling protocol (GTP) tunnel information by coordinated and correlating packet detection rules (PDRs) and forwarding action rules (FARs) as the subscriber moves to different cell sites, and correlating the subscriber's GTP tunnel user data with the specific PFCP session from the GTP tunnel information retrieved from the PDR and/or the FAR.

Disclosed herein is a system, apparatus, and method that can address the technical challenges by processing PFCP messages to create subscriber sessions. Within the sessions, the system manages the PDRs and FARs and extracts the GTP tunnel information used to carry the subscriber data and correlate with the incoming GTP data stream. The data steam can be enriched from the information retrieved from the PFCP Session. In addition to providing the enriched information to the subscriber data, the system can use the correlation and extraction of key data to filter in/out the subscriber traffic based on the monitoring system's requirements.

In some embodiments, the system correlates and extracts information for the tunnels. The system uses PCFP processing to pass key information for the processing of the user plane (e.g., N3) data when establishing the GTP correlation table, which include subscriber identities, a user location, a service/quality, a handset type, or filtering in/out based on a cell tower internet protocol (IP) address, a user identity, or an access point name (APN).

In some embodiments, the disclosure herein provides a comprehensive solution to enriching user data. In some embodiments, the disclosure provides a novel way to track the user and provide enriched user data from the PFCP interface. In some embodiments, the disclosure herein effectively monitors the user plane interface in real-time.

Referring now to FIG. 1A, a block diagram of an environment 100A for monitoring a 5G network 104 is depicted, in accordance with some embodiments. The environment 100A includes a network monitoring device (e.g., a probe) 102 coupled to a 5G (New Radio) network 104. The network monitoring device 102 captures traffic (e.g., messages, packets) transmitted on various interfaces of the 5G network 104, deciphers traffic, extracts user data from the traffic, self-correlates user data, and correlates user data to subsequent traffic transmitted by a user (e.g., subscriber) over various interfaces.

The 5G network 104 includes user equipment (UE) 106 such as a mobile device, a phone, a smart phone, an Internet of Things (IoT) device, a vehicular communications device, a computer, a laptop, a tablet, a smart watch, or any 3GPP device associated with a user. The 5G network 104 is divided between a user plane (UP) 111 where the data communications between the UE 106 and the DN 114 are processed, and a control plane (CP) 113 where all the signaling communications take place. The 5G network 104 includes a radio access network (RAN) 108 that is in communication with the UE 106 via a Uu (air, wireless, etc.) interface 109. The RAN 108 covers a geographical area which is divided into cell areas, with each cell area being served by a base station (e.g., a cell tower, a Next Generation nodeB (gNB), etc.).

The 5G network 104 includes a core network (CN, e.g., a 5G core network) 112, which provides access to one or more data networks (DNs) such as the DN 114 (e.g., the Internet, a local area network, an internet protocol multimedia subsystem (IMS) network, etc.). Part of the CN 112 is in the UP 111 and the other part of the CN 112 is in the CP 113. The part of the CN 112 that is in the CP 113 includes a service-based architecture (SBA) in which messaging/signaling between network functions (NFs) are exposed via (e.g., happen on top of) hypertext transfer protocol (HTTP)/2 (e.g., HTTP or HTTP2) representational state transfer (REST)-ful application program interface (API). Each of the components of the CN 112 can produce and/or consume NF services over the HTTP/2 transport. In some embodiments, container orchestrators (e.g., Docker containers, Kubernetes, etc.) and microservices are employed in implementing the NFs.

The CN 112 includes, in the UP 111, a user plane function (UPF) 126 that forwards user traffic (e.g., user data, protocol data units (PDUs), user packets, messages) associated with the UE 106 between one or more access networks such as the RAN 108 and one or more data networks (DNs) such as the DN 114 (e.g., the Internet, a local area network, an internet protocol multimedia subsystem (IMS) network, etc.). For example, packets toward the UE 106 coming from the DN 114 are routed, based on a destination IP, to the UPF 126. In the example, the UPF 126 processes the packets and encapsulates them in a general radio service packet (GPRS) tunneling protocol (GTP)-user plane (U) tunnel, which will transport the user packets across the RAN 108 to reach the UE 106. The UPF 126 can enforce quality of service (QoS) on uplink and downlink traffic of the UE 106 based on service data flow (SDF) templates. The UPF 126 is in communication with the RAN 108 via an N3 interface 110. The N3 interface 110 is a UP interface. The UPF 126 is in communication with the DN 114 either directly or via another UPF.

Some embodiments include two uni-directional GTP-U tunnels connecting the RAN 108 and UPF 126. The access node (AN) tunnel on a gNB of the RAN 108 includes the gNB's IP address and the UE's 106 tunnel endpoint identifier (TEID) (e.g., a TEID_an, a GTP-U TEID downlink (DL)), which is the GTP-U TED at the gNB. This is the tunnel for the UPF 126 to forward the UE's 106 downlink traffic to the UE 106 via the gNB. The core node (CN) tunnel on the UPF 126 includes the UPF's 126 IP address and the UE's TED (e.g., a TED_cn, a GTP-U TEID uplink (UL)), which is the GTP-U TED at the UPF 126. This is the tunnel for the gNB to forward the UE's 106 uplink traffic to the DN 114 via the UPF 126.

The user traffic transmitted over the N3 interface 110 can include one or more mobile IDs of the UE 106. In some embodiments, the one or more mobile IDs include one or more temporary IDs. In some embodiments, the one or more temporary IDs includes one or more of a temporary mobile subscriber identity (TMSI), a shorten(S)-TMSI, a 5G-S-TMSI, a globally unique temporary ID (GUTI), or a 5G-GUTI. In some embodiments, the one or more mobile IDs include one or more concealed identities such as a subscription concealed ID (SUCI). In some embodiments, the SUCI includes a concealed permanent ID (e.g., a subscriber permanent identifier (SUPI)), while in other embodiments such as in a null-scheme, the SUCI includes a non-concealed (revealed) permanent ID.

The user traffic transmitted over the N3 interface 110 can include session details of a session. In some embodiments, the session details includes network information, session information, user/subscriber information, user location, and the like. In some embodiments, the network information includes a client internet protocol (IP) address, a service IP address, a service/data network name (DNN), etc. In some embodiments, the session information includes the DNN, a radio access technology (RAT) type, a quality of service (QoS), etc. In some embodiments, the user information includes a SUPI, a permanent equipment identifier (PEI), a general public subscription identifier (GPSI), subscriber IP addresses, a mobile subscriber international integrated services digital network (MSISDN) number, a mobile equipment identity (MEI), etc. In some embodiments, the user location includes a tracking area code (TAC), a cell area, a public land mobile network (PLMN), etc.

The CN 112 includes, in the CP 113, the access and mobility management function (AMF) 114, which manages access of the UE 106. The AMF 116 is responsible for coordinating authentication and registering users to the network. The AMF 116 also manages mobility of the UE 106 when the UE 106 roams from one gNB to another for session continuity. The AMF 116 is in communication with the UE 106 via an N1 interface 118. The AMF 116 is in communication with the RAN 108 via an N2 interface 120. FIG. 1A shows the interfaces as logical interfaces. In particular, the N1 interface 106 is part of the non-access stratum (NAS) which is a highest functional layer in a protocol stack between the CN 112 and the UE 106. In some embodiments, a message sent over the N1 interface are referred to as a NAS PDU. Although most of the logical interfaces are same as their physical counterparts, messages transmitted over the N1 interface are physically transmitted via the RAN 108. In some embodiments, at least one of the UE 106, the RAN 108, or the AMF 116 encapsulates (e.g., appends, adds) the N1 messages with additional information elements (IEs).

The UE 106 registers and authenticates after the UE 106 transitions from an idle state. For example, the UE 106 sends a registration (e.g., initial NAS, initial UE, registration request, initial setup) message to the AMF 116. The registration message can include IEs including IEs needed to establish security in the initial message when the UE 106 has no NAS security context.

The registration message can include IEs for identifying the UE 106 or a user associated with the UE 106. The registration message can include one of one or more mobile IDs. Other messages transmitted over the N1 interface or the N2 interface (e.g., de-registration request, service request, identity response, etc.) may include one or more mobile IDs.

In some embodiments, the RAN 108 allocates a RAN UE a Next Generation Application Protocol (NGAP) ID to be used for (e.g., associated with) an NGAP session between the UE 106 and the AMF 116. In some embodiments, the RAN 108 encapsulates the registration message (e.g., the NAS PDU) with the RAN UE NGAP ID and forwards the encapsulated message to the AMF 116. In some embodiments, the AMF 116 allocates an AMF UE NGAP ID to be used for the NGAP session. In some embodiments, in the registration message or a subsequent N1 message (e.g., a downlink NAS transport) from the AMF 116 to the UE 106, the AMF 116 includes the AMF UE NGAP ID.

When the registration procedure of the UE 106 is successfully completed, the UE 106 can initiate a PDU session establishment request to the AMF 116 via the gNB over the N1 interface. In some embodiments, the objective of the UE's PDU session establishment is to establish a default QoS flow (QFI) between the UE 106 and the Data Network (DN) 114 via the gNB. The UE 106 can then use the default QFI inside the established PDU session to exchange traffic with the DN 114.

The CN 112 includes, in the CP 113, the session management function (SMF) 122, which manages access of the UE 106. In some embodiments, the SMF 122 keeps track of PDU sessions and QFIs in the 5G network 104 for UEs such as the UE 106 and make sure their states and status are in sync between NFs in the CP 113 and components in the UP 111. The SMF 122 communicates with the AMF 116 over an N11 interface 124. In some embodiments, the SMF 122 exchanges messages with the AMF 116 such as session management (SM) context create requests, SM context create responses, SM context update requests and SM context update responses.

The SMF 122 communicates with the UPF 126 over an N4 interface 128. The control protocol used on the N4 is the packet forwarding control protocol (PFCP). The N4 interface 128 can be referred to as a PFCP interface. The PFCP is used to manage the data flow at the user plane. The user plane (e.g., user plane nodes) can include the UPF 126 or, in the case of a 4G network, a gateway-U (see FIG. 1C for details). For the 5G network 104, managing the data flow is done by applying rules on data coming in the UPF 126 and then routing the data and applying rules on the way out. The PFCP handles data coming into the UPF 126 using packet detection rules (PDRs) by detecting the incoming GTP IP address and TEID. The PCFP handles data going out of the UPF 126 using the associated Forward Action Rule (FAR) that creates the outgoing GTP header with the FAR's TEID and IP Address. This PDR to FAR association is done by PFCP for each GTP tunnel pair for bi-directional tunnels setup by N11. In some embodiments, for a given tunnel, the PDR specifies the source interface and the FAR specifies the destination interface.

Messages transmitted over the N4 interface include a PFCP session establishment request, a PFCP session establishment response, a PFCP session modify request, and a PFCP session modify response. The PFCP session establishment request message is for UE traffic classification, queuing, scheduling, and marking/remarking. In some embodiments, the PFCP session establishment request message includes user plane information such as one or more of the PDR or the FAR. In some embodiments, the PDR includes packet detection information (PDI) to classify DL traffic using 5-tuple to map the DL traffic (i.e., SDF, e.g., an application such as a control/session initiation protocol (SIP) or payload/real-time transport protocol (RTP) application) to a QFI (e.g., SDF Binding) within the PDU session. In some embodiments, the 5-tuple information (also known as tunnel inner parameters, which includes a first user plane internet protocol (IP) address, a second user plane IP address, an identifier of one of a user datagram protocol (UDP) or a transmission control protocol (TCP), a first user plane port, and a second user plane port) is transmitted over the user plane interface. The UL PDI is used to verify the UL SDF to QFI mapping before the UPF forward the UE's traffic to the DN. In some embodiments, the PDI includes a GTP IP address and TED of the source interface. In some embodiments, the FAR is for service chaining's packet processing operations such as forward, duplicate, send to control plane, etc. In some embodiments, an outer header of the FAR includes a GTP IP address and TEID of the destination interface.

Messages over the N4 interface can include control plane information such as one or more session endpoint identifiers (SEIDs) and fully qualified SEIDs (F-SEIDs). Each of the SEIDs and F-SEIDs can include a key. The keys can be used (e.g., by identifying the matching keys) to map a first type of PFCP message to a second type of PFCP message. For example, if a key from an SEID of an establishment response message matches a key from an F-SEID of an establishment request message, then the establishment response message is mapped to (e.g., is identified to be in response to) the establishment request message.

Messages over the N4 interface can include one or more user identities (IDs, e.g., identifiers). In some embodiments, the one or more user IDs can include at least one of one or more mobile IDs or one or more permanent IDs. In some embodiments, the one or more permanent IDs includes a subscription permanent identity (SUPI), an international mobile subscriber identity (IMSI), an international mobile equipment identity (IMEI), an IMEI software version (IMEISV), or a network access identity (NAI). In some embodiments, the SUPI includes one or more of the IMSI, the IMEI, the IMEISV, or the NAI.

The network monitoring device 102 is connected to the 5G network 104 using various links. For example, the network monitoring device 102 is coupled to the N3 interface 110 via a link 136 and the N4 interface 128 via a link 138. In some embodiments, the network monitoring device 102 is coupled to other interfaces (e.g., the N1 interface 118, the N2 interface 120, the N11 interface 124, Uu interface 109, etc.) via other links. Each of the links can be passive or active and include software, firmware, and/or hardware components, such as taps, probes, or port mirrors that can be positioned in-line along communication links between various components of the 5G network 104. In the case of a physical site, each link can receive a copy of packets flowing over the respective interface from a tap in-line with an edge router located at the physical site, or from a switch port analyzer ("SPAN") port on the edge router.

Figure 1B:
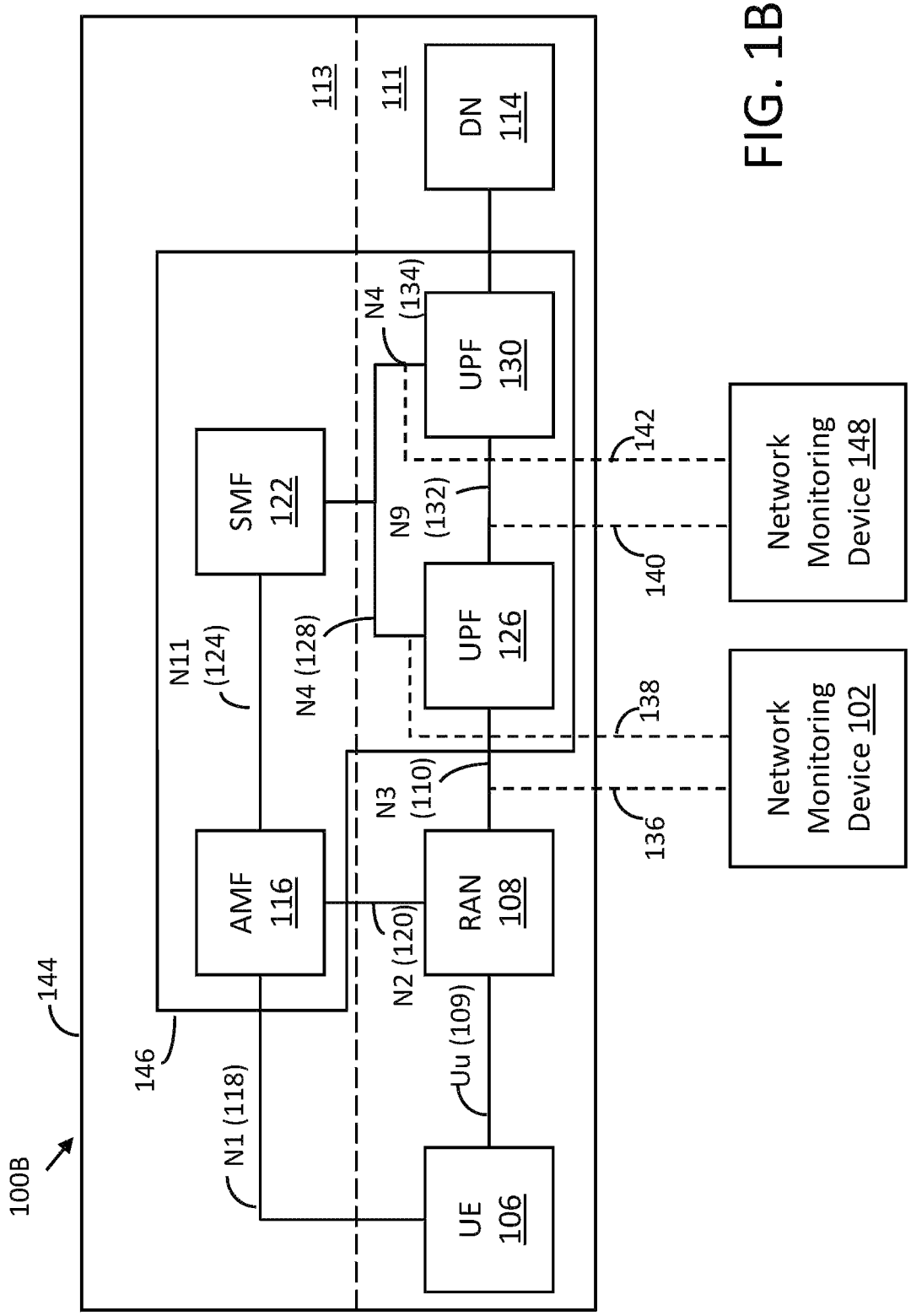
FIG. 1B is another block diagram of an environment for monitoring a 5G network, in accordance with some embodiments.

FIG. 1B is a block diagram of an environment 100B for monitoring a 5G network 144, in accordance with some embodiments. The 5G network 144 includes the core network (CN) 146. The environment 100B, the 5G network 144, and the CN 146 are similar to the environment 100A, the 5G network 104, and the CN 112, respectively, except that the CN 146 includes the UPF 130, which is a second instance of a UPF, in addition to the UPF 126. The UPF 130 is in communication with the UPF 126 via a N9 interface 132. The UPF 130 is in communication with the SMF 122 via a N4 interface 134. The UPF 130 is in communication with the DN 114. Although environment 100B and the CN 146 includes two UPFs, greater than two UPFs is within the scope of the present disclosure.

In some embodiments, the environment 100B includes a network monitoring device 148 in addition to the network monitoring device 102. In some embodiments, the network monitoring device 148 is coupled to the N9 interface 132 via a link 140 and the N4 interface 134 via a link 142. In some embodiments, the network monitoring device 102 is coupled to each of the interfaces 110, 128, 132, and 134.

Figure 1C:
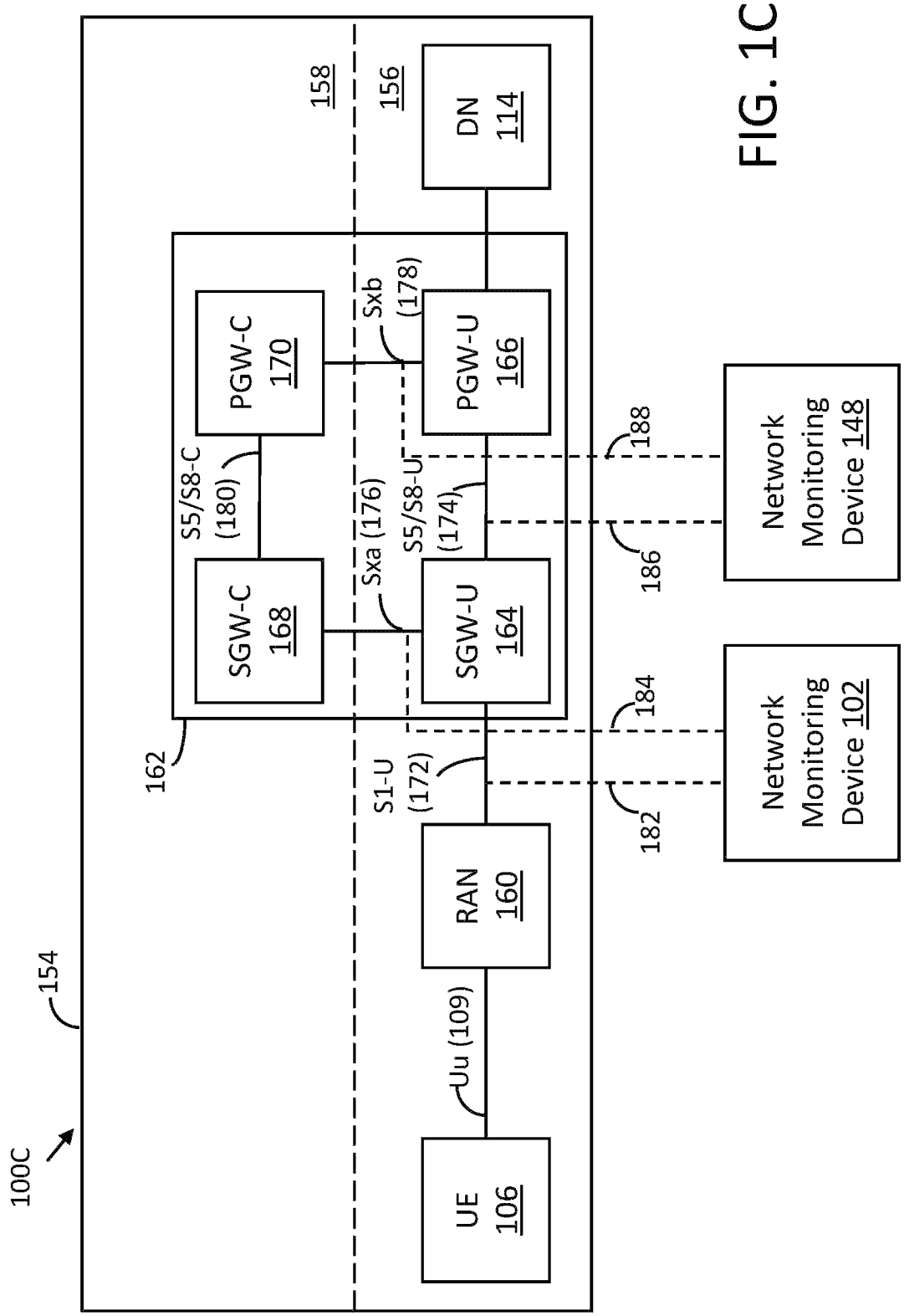
FIG. 1C is a block diagram of an environment for monitoring a 4G network, in accordance with some embodiments.

FIG. 1C is a block diagram of an environment 100C for monitoring a 4G network 154, in accordance with some embodiments. The 4G network 154 includes a UP 156 and a CP 158. The 4G network 154 includes a RAN 160 and the core network (CN) 162. The environment 100C, the 4G network 154, the UP 156, the CP 158, the RAN 160 and the CN 162 are similar to the environment 100A, the 5G network 104, the UP 111, the CP 113, the RAN 108, and the CN 112, respectively, except that the RAN 160 is an Evolved universal mobile telecommunications system (UNITS) terrestrial radio access network (E-UTRAN) and the CN 162 is an Evolved packet core (EPC). The RAN 160 includes Evolved nodeBs (eNBs) rather than gNBs.

The CN 162 includes a serving gateway (SGW)-U 164, a packet data network gateway (PGW)-U 166, a SGW-control plane (C) 168, and a PGW-C 170. The SGW-U 164 and the PGW-U 166 are in the UP 156, and can be referred to as gateway-Us, whereas the SGW-C 168 and the PGW-C 170 are in the CP 158, and can be referred to as gateway-Cs. The SGW-U 164 is in communication with the RAN 160 via an S1-U interface 172, the SGW-U 164 is in communication with the PGW-U 166 via an S5/S8-U interface 174, the SGW-U 164 is in communication with the SGW-C 168 via an Sxa interface 176, the PGW-U 166 is in communication with the PGW-C 170 via an Sxb interface 178, and the SGW-C 168 is in communication with the PGW-C 170 via an S5/S8-C interface 180. The control protocol used on the Sxa interface 176 and Sxb interface 178 is the PFCP, whereas the interfaces 172 and 174 are UP interfaces.

For the 4G network 154, the PFCP manages the data flow at the user plane by applying rules on data coming in the SGW-U 164 or the PGW-U 166 and then routing the data and applying rules on the way out. The PFCP handles data coming into the SGW-U 164 or the PGW-U 166 using PDRs by detecting the incoming GTP IP address and TEID. The PCFP handles data going out of the SGW-U 164 or the PGW-U 166 using the associated FAR that creates the outgoing GTP header with the FAR's TEID and IP Address. This PDR to FAR association is done by PFCP for each GTP tunnel pair for bi-directional tunnels setup by S11 or S5/S8.

In some embodiments, the environment 100B includes a network monitoring device 148 in addition to the network monitoring device 102. In some embodiments, the network monitoring device 102 is coupled to the S1-u interface 172 via a link 182 and the Sxa interface 176 via a link 184. In some embodiments, the network monitoring device 148 is coupled to the S5/S8-U interface 174 via a link 186 and the Sxb interface 178 via a link 188. In some embodiments, the network monitoring device 102 is coupled to each of the interfaces 172-178.

Figure 2A:
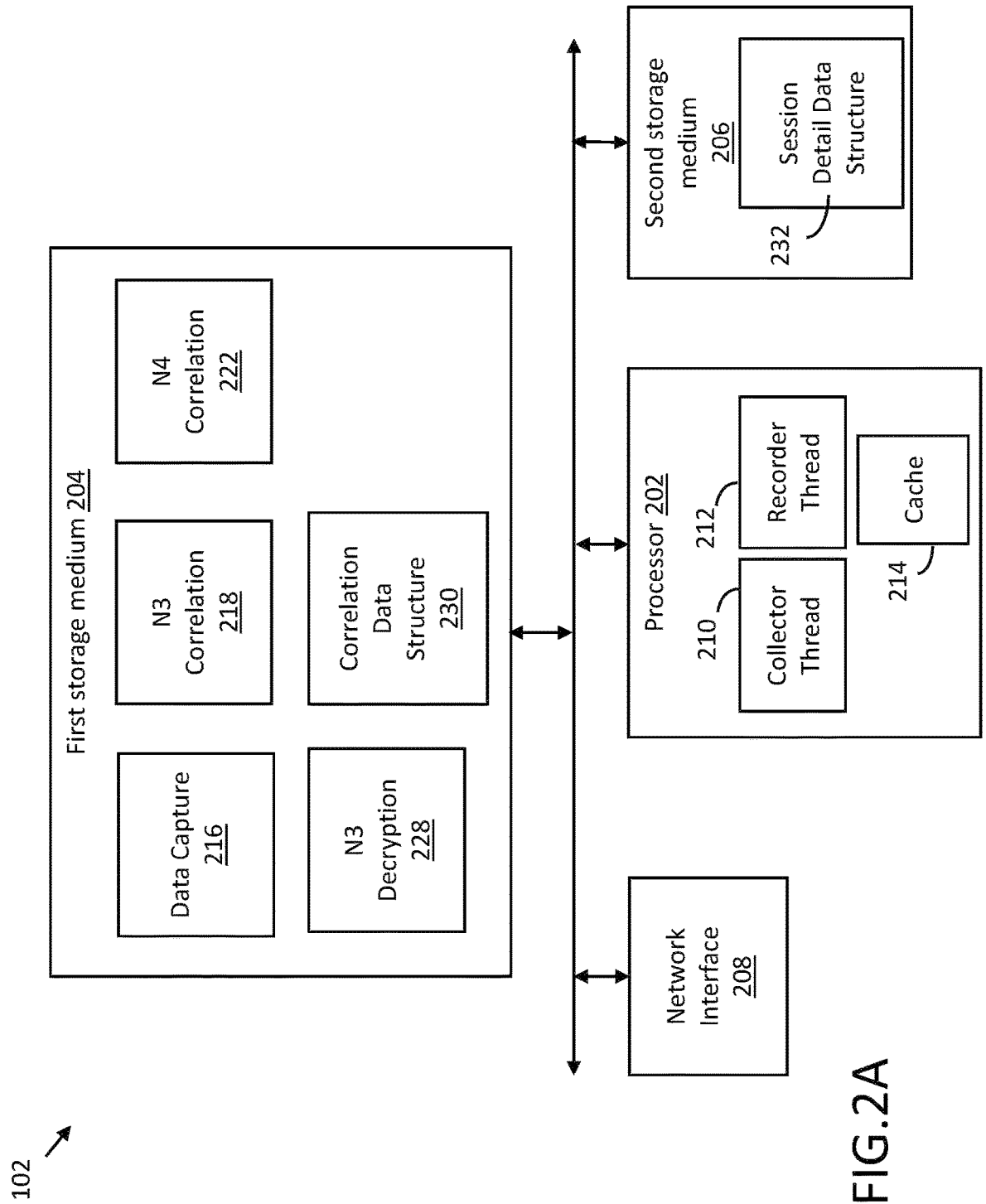
FIG. 2A is a block diagram of the network monitoring device, in accordance with some embodiments.

Referring now to FIG. 2A, a block diagram of the network monitoring device 102 is depicted, in accordance with some embodiments. The network monitoring device 102 includes a processor 202, a first storage medium 204, a second storage medium 206, and a network interface 208. The network monitoring device 102 may include other components such as input devices (e.g., keyboard, mouse) and output devices (e.g., display, monitor).

The processor 202 executes computer instructions stored in one or more of the first storage medium 204 or the second storage medium 206. Although only a single processor is shown in FIG. 2A, any number of processors is within the scope of the present disclosure. The processor 202 includes a cache 214. In some embodiments, user data extracted from captured traffic data can be stored in the cache 214.

The processor 202 includes one or more threads. For example, as shown in FIG. 2A, the processor includes a collector thread 210 and a recorder thread 212. In some embodiments, the collector thread 210 performs at least one of collecting user/session details/data/metadata (e.g., network information, session information, user information, user location, etc.) extracted from messages (e.g., N1, N2, or N3 messages) transmitted over various (e.g., N1, N2, or N3) interfaces, storing the session details in the cache 214 or the first storage medium 204, or aggregating statistics on the session details. In some embodiments, the recorder thread 212 stores, or copies, one or more of the messages or the session details to the second storage medium 206. Advantageously, by processing various messages in parallel in separate (e.g., dedicated) threads, the monitoring device 102 can achieve lower latency and live-time, or substantially live-time, monitoring of the 5G network 104 or the 4G network 154. Although the processor 202 is shown as having one core and two threads, the processor 202 can have any number of cores and threads and remain within the scope of the present disclosure.

The first storage medium 204 stores instructions (e.g., computer instructions, programmed instructions) for one or more of processing, extracting, correlating, generating, storing, or retrieving traffic data (e.g., messages, packets, headers, payloads, fields, information elements, parameters, keys, etc.) or metadata derived from the traffic data. The first storage medium 204 is implemented in one of various devices (e.g., Random-Access Memory (RAM), static RAM (SRAM), dynamic RAM (DRAM), Resistive RAM (Re-RAM), magnetoresistive RAM (MRAM)) that has a faster read or write speed than the second storage medium 206.

In some embodiments, the first storage medium 204 includes instructions for data capture 216, N3 correlation 218, N4 correlation 222, and N3 decryption 228. In some embodiments, the data capture 216 instructions include instructions to capture messages (e.g., control packets or data packets). In some embodiments, the data capture 216 instructions include instructions to extract user correlation/monitoring-related data (e.g., mobile IDs, permanent IDs, PDU session IDs, NGAP IDs, container IDs, security context (e.g., one or more cipher keys, key set identifier, etc.), time stamps, any parameters or state information related to mapping/correlating users, NGAP sessions, PDU sessions, or session details) from the captured messages. For example, the data capture 216 instructions include instructions to capture messages transmitted over the N4 interface 128 and extract one or more of a permanent ID, a PDU session ID, a general radio service packet (GPRS) tunneling protocol (GTP)-user plane (U) tunneling endpoint identifier (TED), an SEID, an F-SEID, or the session details associated with the user from the captured message transmitted over the N4 interface 128. In another example, the data capture 216 instructions include instructions to capture messages transmitted over the N3 interface 110 and extract one or more of the GTP-U TEID, tunnel inner parameters, or the session details from messages transmitted over the N3 interface 110. The data capture 216 instructions can include instructions for software agents or virtual devices that remotely operate on, or control, each of the links (e.g., links 136 and/or 138) and/or any associated hardware.

In some embodiments, the N3 correlation 218 instructions include instructions to correlate/map/link any user data extracted from messages captured over the N3 interface 110. For example, the N3 correlation 218 instructions include instructions to correlate a permanent ID to session details. In some embodiments, correlating includes storing a first parameter in a first field of a record associated with a user (e.g., a session details record) and storing a second parameter in a second field of the record associated with the user. This may be referred to as generating a mapping from the first parameter to the second parameter. For example, the N3 correlation 218 instructions include instructions to store (e.g., populate) a first parameter (e.g., SUPI, another permanent ID, or one or more of the tunnel inner parameters) extracted from an N4 message or an N3 message in a first field of a session details record and to a second parameter (e.g., store session details) extracted from an N3 message in a second field of a session details record. In some embodiments, each mapping may be a key-value pair in which the first parameter is a key and the second parameter is the value. In some embodiments, the first parameter is an input to a hash function which generates or fetches (e.g., retrieves, accesses) the second parameter or a location/address of the second parameter.

In some embodiments, the N4 correlation 222 instructions include instructions to correlate a TED (e.g., an N3/user plane TEID, a GTP TEID, a GTP-U TEID) extracted from a message captured over the N4 interface 128 to permanent ID (e.g., a SUPI), a mobile ID, or a PDU session ID extracted from the message or another message captured over the N4 interface 128. In some embodiments, the N4 correlation 222 instructions include instructions to store a GTP TEID in a first field of a PFCP PDU session record and store a permanent ID or other ID in a second field of the PFCP PDU session record. In some embodiments, the N4 correlation 222 instructions include instructions to correlate (a) an GTP TEID UL to the permanent ID or other ID and (b) a GTP TEID DL to the permanent ID or other ID. In some embodiments, separate session records maintain the uplink TEID-permanent ID mapping and the downlink TEID-permanent ID mapping.

In some embodiments, the N3 decryption 228 instructions include instructions to decipher a ciphered N3 message using a cipher key, which may be stored in the PFCP PDU session record, the session details record, or another record associated with the user. In some embodiments, the N3 decryption 228 instructions include instructions to determine whether traffic data is ciphered. For example, security state information may be extracted from a message or a separate message that may indicate whether the message is ciphered. The N3 decryption 228 instructions may include instructions to decipher a message if the extracted security state information indicates that the message is ciphered.

The first storage medium 204 includes the correlation data structure 230, which stores the mappings in one or more data structures (e.g., databases, tables, files). For example, a first table stores PDU session records (e.g., mapping of GTP TEID-SUPI pairs). More or different mapping tables are within the scope of the present disclosure. Each table can include a number of records (e.g., rows). Each record may be associated with one UE (e.g., a first record is associated with the UE 106). In some embodiments, each record has a first field (e.g., entry) populated by the first parameter (e.g., an IE) of the mapping, or a hash thereof, and each of the one or more second fields populated by the second parameter/IE (e.g., one of the second parameters, if there is more than one) of the mapping, or a hash thereof. In some embodiments, the table is a hash table (e.g., a key-value table) in which the record containing the one or more second fields (e.g., the values, values in a bucket, etc.) is determined, fetched, or located based on transforming the first parameter by a hashing function (e.g., modulus of a predetermined number).

The second storage medium 206 stores data or metadata that is the result of processing or correlating the traffic data. The second storage medium 206 is implemented in one of various devices (e.g., solid-state drive, hard disk drive, optical drive, etc.) that can store a greater amount of data than the first storage medium 204. In some embodiments, the second storage medium 206 is distributed across multiple such devices. In some embodiments, the second storage medium 206 stores the instructions for the data capture 216, the N4 correlation 222, the N3 correlation 218, and the N3 decryption 228, or instances thereof. In some embodiments, the processor 202 can execute each of the instructions 216, 218, 222, and 228 from the second storage medium 206. In some embodiments, the second storage medium 206 stores copies of the correlation data structures 230. In some embodiments, the second storage medium 206 includes the session detail data structure 232. The session detail data structure 232 includes session details (e.g., network information, session information, user information, user location, etc.) extracted from the captured messages. In some embodiments, session details for each user is in a respective session details record. In some embodiments, a user's session details record persist even after the user has changed PDU sessions (e.g., PDU session IDs) or GTP tunnels (GTP TEIDs). In some embodiments, the second storage medium 206 stores the captured messages, monitoring-related user parameters (e.g., the SUPI, the PDU session ID, the GTP TED, etc.) extracted from the captured messages, etc. In some embodiments, each session details record includes a permanent ID field populated with a SUPI of the UE 106 and a session details field populated with a session details populated with session details of the UE 106.

Figure 2B:
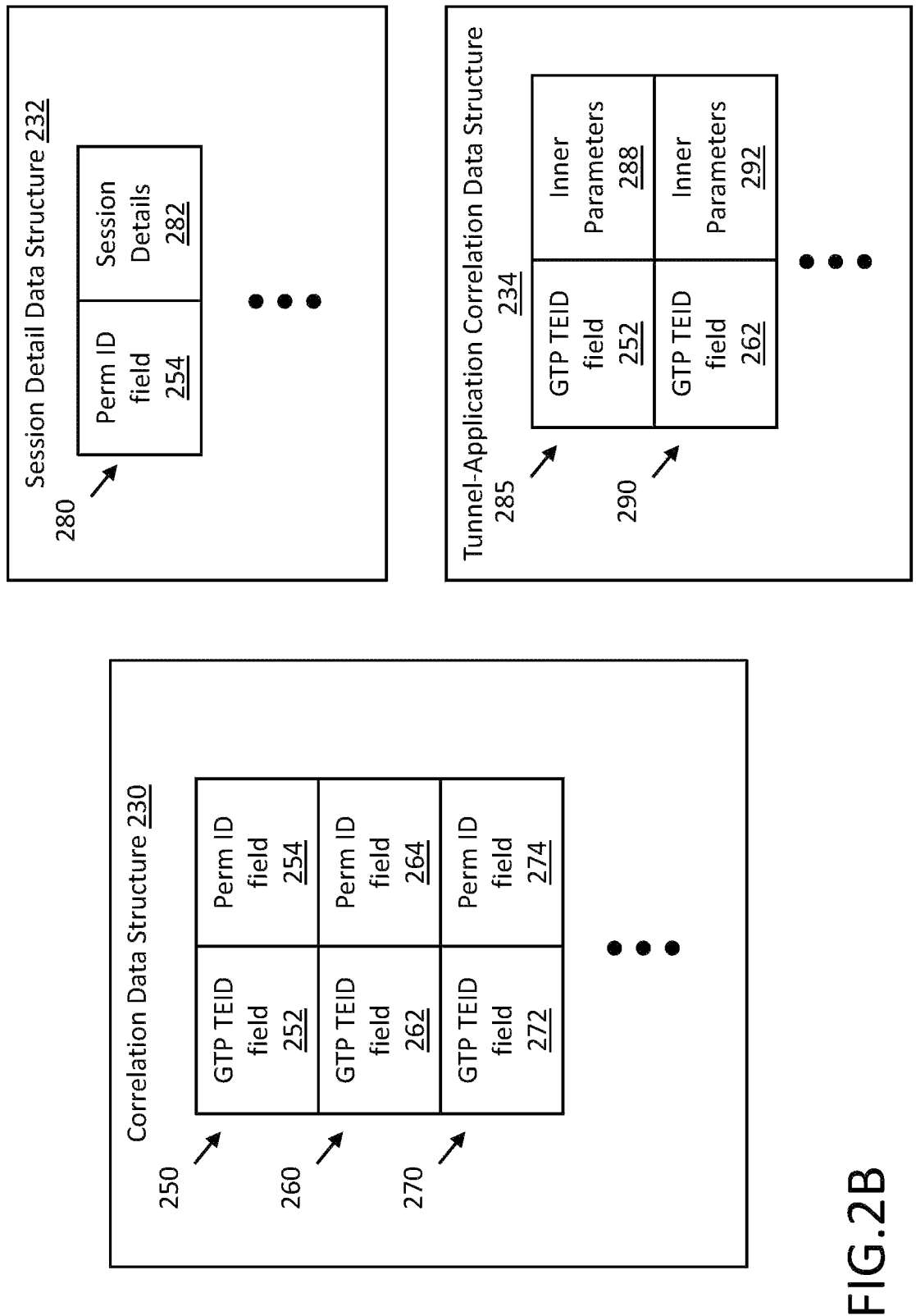
FIG. 2B is a block diagram of the correlation data structure and the session detail data structure, in accordance with some embodiments.

FIG. 2B illustrates records that are in a correlation data structure 230, the session detail data structure 232, and the tunnel-application correlation data structure 234, in accordance with some embodiments of the present disclosure. In some embodiments, the correlation data structure 230 is a data structure that includes PFCP PDU session records. In some embodiments, each PFCP PDU session record maps GTP TEIDs to SUPIs for different UEs such as the UE 106. For example, a PFCP PDU session record 250 includes a GTP TEID field 252 and a permanent ID field 254, a PFCP PDU session record 260 includes a GTP TEID field 262 and a permanent ID field 264, and a PFCP PDU session record 270 includes a GTP TED field 272 and a permanent ID field 274. Each of the GTP TEID fields may be populated by a different GTP TEID. Each GTP TEID is associated with a GTP tunnel. Some GTP TEID fields may be populated by a GTP TEID UL, while some other GTP TEID fields may be populated by a GTP TEID DL. For example, the GTP TEID field 252 is populated by a GTP TED UL and the GTP TEID field is populated by a GTP TEID DL. In some embodiments, the UE 106 has at least one DL GTP tunnel and one UL GTP tunnel. In some embodiments, the UE 106 has more than one pair of DL/UL GTP tunnels. Each of the permanent ID fields may be populated by one of a SUPI, a PEI, an IMEI, etc.

In some embodiments, the session detail data structure 232 includes one or more session detail records such as session detail record 280. In some embodiments, the session detail record 280 includes the permanent ID field 254 and a session details field 282. In some embodiments, the session details field 282 includes multiple fields (e.g., at least one for network information, at least one for session information, at least one for user information, at least one for user location, etc.).

In some embodiments, the tunnel-application correlation data structure 234 includes one or more tunnel-application session records. In some embodiments, the tunnel-application session record 285 includes the GTP TEID field 252 and inner parameters field 288 that identify the application associated with the GTP-U tunnel of the GTP TEID field 252. In some embodiments, the tunnel-application session record 290 includes the GTP TEID field 262 and inner parameters field 292 that identify the application associated with the GTP-U tunnel of the GTP TEID field 262. In some embodiments, the session details (e.g., session details 282) associated with the GTP-U tunnel, the application, or the permanent ID are loaded into the corresponding tunnel-application session record in the tunnel-application correlation data structure 234. In some embodiments, after the session details are loaded into the tunnel-application session record, the next time a user plane (e.g., N3) message is captured and updated session details are extracted, the stored session details are retrieved from the tunnel-application session record in order to update the stored session details.

Returning to FIG. 2A, the network interface 208 may include a NIC (network interface card) or other standard network interfaces to receive captured network traffic, and to communicate with other network interface devices. For example, the network interfaces 208 may include an N3 interface 110 (e.g., the link 136), an N4 interface 128 (e.g., the link 138), an 802.11 interface, an Ethernet interface, or other wired or wireless network interfaces.

Figure 3A:
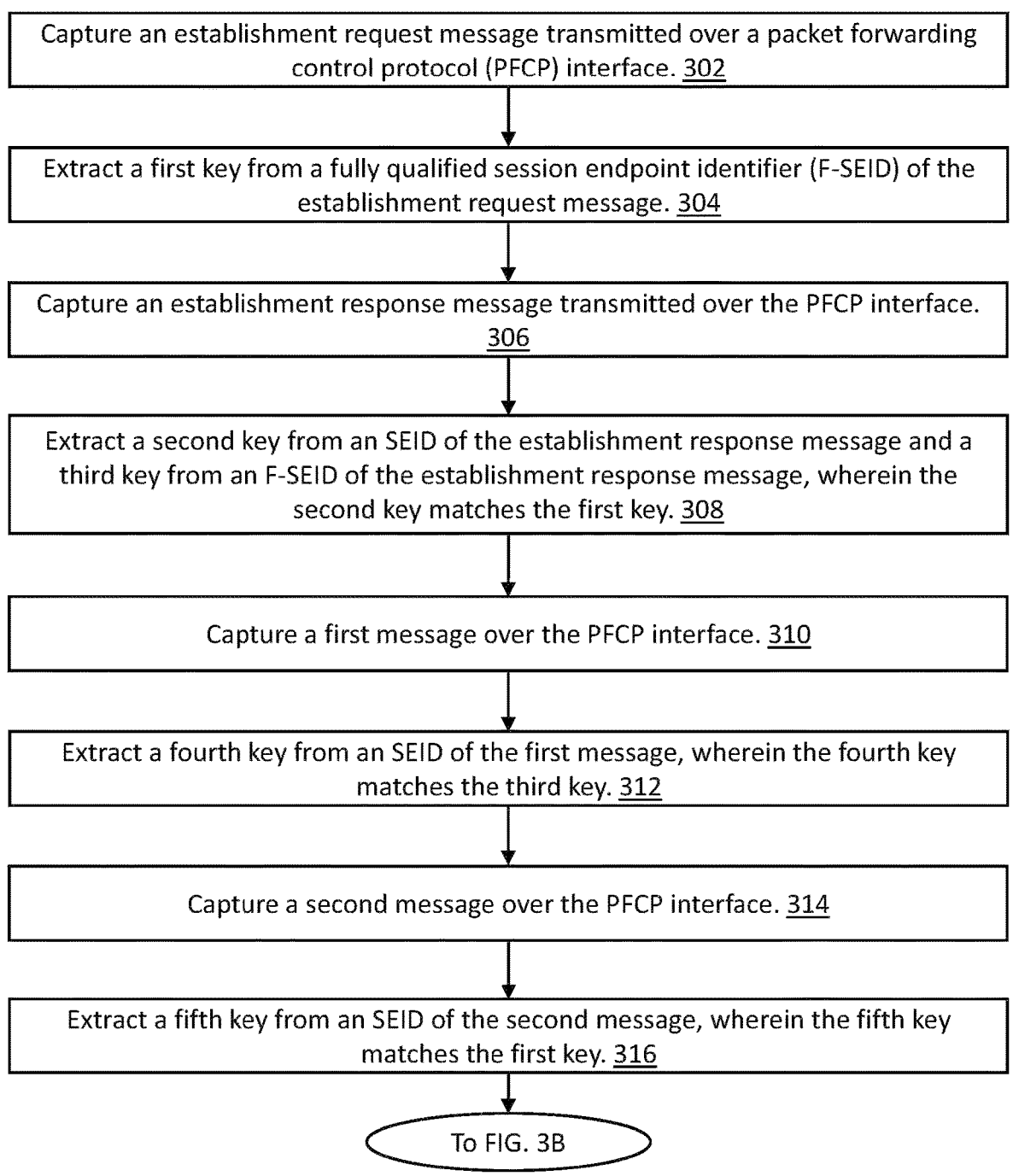

Referring now to FIGS. 3A-3B, a flow chart of an example method 300 for associating a user with a GTP-U tunnel, in accordance with some embodiments. The method 300 can be performed by one or more systems, components, or modules depicted in FIG. 1A, 1B, 1C, 2A, or 2B, including, for example, the network monitoring device 102, the processor 202, etc. In some embodiments, instructions for performing the method 300 are stored in the first storage medium 204. Additional, fewer, or different operations may be performed in the method 300 depending on the embodiment. Additionally, or alternatively, two or more of the blocks of the method 300 may be performed in parallel.

Referring now to FIG. 3A, the processor 202 captures an establishment request message transmitted over a packet forwarding control protocol (PFCP) interface (at operation 302). In some embodiments, the PFCP interface is one of an N4 interface, an Sxa interface, or an Sxb interface and wherein the user plane interface is one of an N3 interface, an N9 interface, an S1-U interface, or an S5/S8-U interface. The processor 202 extracts a first key from a fully qualified session endpoint identifier (F-SEID) of the establishment request message (at operation 304). The processor 202 captures an establishment response message transmitted over the PFCP interface (at operation 306). The processor 202 extracts a second key from an SEID of the establishment response message and a third key from an F-SEID of the establishment response message, wherein the second key matches the first key (at operation 308). The processor 202 captures a first message over the PFCP interface (at operation 310). In some embodiments, the first message is one or more of a PFCP modify request or a PFCP deletion request and the second message is one or more of a PFCP modify response or a PFCP deletion response. The processor 202 extracts a fourth key from an SEID of the first message, wherein the fourth key matches the third key (at operation 312). The processor 202 captures a second message over the PFCP interface (at operation 314). In some embodiments, the second message is one or more of a PFCP modify request or a PFCP deletion request and the second message is one or more of a PFCP modify response or a PFCP deletion response. The processor 202 extracts a fifth key from an SEID of the second message, wherein the fifth key matches the first key (at operation 316).

In some embodiments, the processor 202 captures a fourth message transmitted over a user plane interface. In some embodiments, the processor 202 extracts, from the fourth message, one of the UL GTP-U TEID or the DL GTP-U TED, a first user plane internet protocol (IP) address, a second user plane IP address, an identifier of one of a user datagram protocol (UDP) or a transmission control protocol (TCP), a first user plane port, and a second user plane port.

The first user plane internet protocol (IP) address, a second user plane IP address, an identifier of one of a user datagram protocol (UDP) or a transmission control protocol (TCP), a first user plane port, and a second user plane port may be referred to as inner parameters and may be identifying an application that is associated with the one of the UL GTP-U TED or the DL GTP-U TED. The application may be a control protocol application such as a SIP application or a payload protocol application such as an RTP application.

In some embodiments, the processor 202 captures a fifth message transmitted over a user plane interface. In some embodiments, the processor 202 extracts, from the fifth message, the other of the UL GTP-U TEID or the DL GTP-U TEID, the first user plane internet protocol (IP) address, the second user plane IP address, the identifier of one of a user datagram protocol (UDP) or a transmission control protocol (TCP), the first user plane port, and the second user plane port. In some embodiments, the processor 202 determines that the UL GTP-U TEID and the DL GTP-U TEID are associated with a same tunnel based on the first user plane internet protocol (IP) address, the second user plane IP address, the identifier of one of a user datagram protocol (UDP) or a transmission control protocol (TCP), the first user plane port, and the second user plane port being the same in the fourth and fifth message.

In some embodiments, the processor 202 stores the UL GTP-U TEID, the DL GTP-U TEID, the first user plane internet protocol (IP) address, the second user plane IP address, the identifier of one of the user datagram protocol (UDP) or the transmission control protocol (TCP), the first user plane port, and the second user plane port in a tunnel-application session record. For example, the processor 202 stores the UL GTP-U TEID in the GTP TEID field 252 of the tunnel-application session record 285 and the first user plane internet protocol (IP) address, the second user plane IP address, the identifier of one of the user datagram protocol (UDP) or the transmission control protocol (TCP), the first user plane port, and the second user plane port in the inner parameters field 288 of the tunnel-application session record 285. In some embodiments, the processor 202 also stores the DL TGP-U TEID in the GTP TEID field 252 of the tunnel-application session record 285. In some embodiments, the processor 202 stores the DL TGP-U TEID in the GTP TEID field 262 of the tunnel-application session record 285 and also stores the first user plane internet protocol (IP) address, the second user plane IP address, the identifier of one of the user datagram protocol (UDP) or the transmission control protocol (TCP), the first user plane port, and the second user plane port in the inner parameters field 292 of the tunnel-application session record 290. In some embodiments, the processor 202 loads the session details to another field of the tunnel-application session record 285 (e.g., and, in some embodiments, the tunnel-application session record 290). In some embodiments, the processor 202 later retrieves the session details from one or more of the tunnel-application session record 285 or the tunnel-application session record 290. In some embodiments, the inner parameters remain the same for a user even if a tunnel changes. In such a case, the tunnel-application session records may be updated accordingly or new tunnel-application session records may be created accordingly.

Referring now to FIG. 3B, the processor 202 extract (a) a permanent ID from one of the establishment request message, the establishment response message, the first message, or the second message, (b) an uplink (UL) general packet radio service (GPRS) tunneling protocol (GTP)-user plane (U) tunnel endpoint identifier (TEID) from a packet detection rule (PDR) of one of the establishment request message, the establishment response message, the first message, or the second message, and (c) a downlink (DL) GTP-U TEID from a forwarding action rule (FAR) of one of the establishment request message, the establishment response message, the first message, or the second message (at operation 318). Operation 318 can happen concurrently with one or more of 304, 308, 312, or 316. In some embodiments, the permanent ID is one of an international mobile subscriber identity (IMSI) or a permanent equipment identifier (PEI). In some embodiments, the processor 202 also extracts an UL GTP-U IP address and a DL GTP-U IP address.

Additionally or alternatively, in some embodiments, the processor 202 extracts, from one of the establishment request message, the establishment response message, the first message, or the second message, one or more of a PDU ID, a session management (SM) context ref, or an SM context status uniform resource identifier (URI). In some embodiments, the processor 202 correlates the permanent ID with the one or more of a PDU ID, SM context ref, or an SM context status URI) extracted from one of the establishment request message, the establishment response message, the first message, or the second message. In some embodiments, the processor 202 correlates the UL GTP-U and DL GTP-U TEIDs with the one or more of a PDU ID, SM context ref, or an SM context status URI extracted from a second one of the establishment request message, the establishment response message, the first message, or the second message.

The processor 202 stores the first key, the third key, permanent ID, the UL GTP-U TEID, and the DL GTP-U TEID in a PFCP protocol data unit (PDU) session record (at operation 320). For example, the processor 202 stores the first key, the third key, permanent ID, the UL GTP-U TEID, and the DL GTP-U TEID in the GTP TEID field 252 of the PFCP PDU session record 250 and the permanent ID in the permanent ID field 254 of the PFCP PDU session record 250. The processor 202 stores the permanent ID in a session details record (at operation 322). For example, the processor 202 stores the permanent ID in a permanent ID field of a sessions details record 280. The processor 202 captures a third message transmitted over a user plane interface (at operation 324). In some embodiments, the third message is transmitted after the first message is transmitted. The processor 202 extracts a first GTP-U TEID from the third message, wherein the first GTP-U TEID matches one of the UL GTP-U TEID or the DL GTP-U TEID (at operation 326). In some embodiments, each of the UL GTP-U TEID, the DL GTP-U TEID, and the first GTP-U TEID is a GTP-U TEID from an access side of a user plane function (UPF). In some embodiments, each of the UL GTP-U TEID, the DL GTP-U TEID, and the first GTP-U TEID is a GTP-U TEID from a core side of a user plane function (UPF).

The processor 202 retrieves the session details record using the first GTP-U TEID (at operation 328). For example, the processor 202 retrieves the permanent ID from the PFCP PDU session record using the first GTP-U TEID and retrieves the session details record associated with (e.g., using) the permanent ID. In some embodiments, the processor 202 stores or updates the session details in the session details record. In some embodiments, the session details record (e.g., the session details therein) include one or more of network information, session information, user information, user location, etc. In some embodiments, the network information includes one or more of a client internet protocol (IP) address, a service IP address, a service/data network name (DNN), etc. In some embodiments, the session information includes one or more of the DNN, a radio access technology (RAT) type, a quality of service (QoS), etc. In some embodiments, the user information includes one or more of a subscriber permanent identifier (SUPI), an international mobile subscriber identity (IMSI), a permanent equipment identifier (PEI), a general public subscription identifier (GPSI), subscriber IP addresses, a mobile subscriber international integrated services digital network (MSISDN) number, a mobile equipment identity (MEI), etc. In some embodiments, the user location includes a public land mobile network (PLMN), etc. In some embodiments, one or more of the session details that is stored in the session details record is extracted in one of the establishment request message, the establishment response message, the first message, the second message, or another message, transmitted over the PFCP interface 124.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. A non-transitory computer readable medium comprising instructions for providing a mobile user monitoring solution that, when executed by a processor, cause the processor to:
    capture a first message over a packet forwarding control protocol (PFCP) interface;
    extract (a) a permanent ID from the first message, (b) an uplink (UL) general packet radio service (GPRS) tunneling protocol (GTP)-user plane (U) tunnel endpoint identifier (TEID) from a packet detection rule (PDR) of the first message, and (c) a downlink (DL) GTP-U TED from a forwarding action rule (FAR) of the first message;
    store the permanent ID, the UL GTP-U TEID, and the DL GTP-U TEID in a PFCP protocol data unit (PDU) session record;
    store the permanent ID in a session details record;
    capture a second message transmitted over a user plane interface after the first message is transmitted;
    extract a first GTP-U TEID from the second message; and
    retrieve the session details record using the first GTP-U TEID by retrieving the permanent ID from the PFCP PDU session record using the first GTP-U TED and retrieving the session details record associated with the permanent ID.

2. The medium of claim 1, wherein the session details record include two or more of network information, session information, user information, or a user location, wherein the network information includes one or more of a client internet protocol (IP) address, a service IP address, a service/data network name (DNN), the session information includes one or more of the DNN, a radio access technology (RAT) type, or a quality of service (QoS), the user information includes one or more of a subscriber permanent identifier (SUPI), an international mobile subscriber identity (IMSI), a permanent equipment identifier (PEI), a general public subscription identifier (GPSI), subscriber IP addresses, a mobile subscriber international integrated services digital network (MSISDN) number, or a mobile equipment identity (MEI), and the user location includes a public land mobile network (PLMN).

3. The medium of claim 1, wherein the instructions cause the processor to:
    extract data from the second message and data from the session details record; and
    correlate the data from the second message with the data from the session details record.

4. The medium of claim 1, wherein the PFCP interface is one of an N4 interface, an Sxa interface, or an Sxb interface and wherein the user plane interface is one of an N3 interface, an N9 interface, an S1-U interface, or an S5/S8-U interface.

5. The medium of claim 1, wherein the first message is one or more of a PFCP modify request or a PFCP deletion request.

6. The medium of claim 1, wherein the permanent ID is one of an international mobile subscriber identity (IMSI) or a permanent equipment identifier (PEI).

7. The medium of claim 1, wherein each of the UL GTP-U TEID, the DL GTP-U TED, and the first GTP-U TEID is a GTP-U TEID from an access side of a user plane function (UPF).

8. The medium of claim 1, wherein each of the UL GTP-U TEID, the DL GTP-U TED, and the first GTP-U TEID is a GTP-U TEID from a core side of a user plane function (UPF).

9. The medium of claim 1, wherein the instructions further cause the processor to:
    capture a third message transmitted over the user plane interface;
    extract, from the third message, one of the UL GTP-U TEID or the DL GTP-U TED, a first user plane internet protocol (IP) address, a second user plane IP address, an identifier of one of a user datagram protocol (UDP) or a transmission control protocol (TCP), a first user plane port, and a second user plane port;
    capture a fourth message transmitted over the user plane interface;
    extract, from the fourth message, the other of the UL GTP-U TEID or the DL GTP-U TED, the first user plane internet protocol (IP) address, the second user plane IP address, the identifier of one of a user datagram protocol (UDP) or a transmission control protocol (TCP), the first user plane port, and the second user plane port; and
    determine that the UL GTP-U TED and the DL GTP-U TEID are associated with a same tunnel based on the first user plane internet protocol (IP) address, the second user plane IP address, the identifier of one of a user datagram protocol (UDP) or a transmission control protocol (TCP), the first user plane port, and the second user plane port being the same in the third and fourth message.

10. An apparatus comprising a processor and a memory, wherein the memory includes programmed instructions that, when executed by the processor, cause the apparatus to:
capture a first message over a packet forwarding control protocol (PFCP) interface;
extract (a) a permanent ID from the first message, (b) an uplink (UL) general packet radio service (GPRS) tunneling protocol (GTP)-user plane (U) tunnel endpoint identifier (TEID) from a packet detection rule (PDR) of the first message, and (c) a downlink (DL) GTP-U TED from a forwarding action rule (FAR) of the first message;
store the permanent ID, the UL GTP-U TEID, and the DL GTP-U TEID in a PFCP protocol data unit (PDU) session record;
store the permanent ID in a session details record;
capture a second message transmitted over a user plane interface after the first message is transmitted;
extract a first GTP-U TEID from the second message; and
retrieve the session details record using the first GTP-U TEID by retrieving the permanent ID from the PFCP PDU session record using the first GTP-U TED and retrieving the session details record associated with the permanent ID.

11. The apparatus of claim 10, wherein the session details record include two or more of network information, session information, user information, or a user location, wherein the network information includes one or more of a client internet protocol (IP) address, a service IP address, a service/data network name (DNN), the session information includes one or more of the DNN, a radio access technology (RAT) type, or a quality of service (QoS), the user information includes one or more of a subscriber permanent identifier (SUPI), an international mobile subscriber identity (IMSI), a permanent equipment identifier (PEI), a general public subscription identifier (GPSI), subscriber IP addresses, a mobile subscriber international integrated services digital network (MSISDN) number, or a mobile equipment identity (MEI), and the user location includes a public land mobile network (PLMN).

12. The apparatus of claim 10, wherein the programmed instructions cause the processor to:
extract data from the second message and data from the session details record; and
correlate the data from the second message with the data from the session details record.

13. The apparatus of claim 10, wherein the PFCP interface is one of an N4 interface, an Sxa interface, or an Sxb interface and wherein the user plane interface is one of an N3 interface, an N9 interface, an S1-U interface, or an S5/S8-U interface.

14. The medium of claim 10, wherein the first message is one or more of a PFCP modify request or a PFCP deletion request.

15. The apparatus of claim 10, wherein the permanent ID is one of an international mobile subscriber identity (IMSI) or a permanent equipment identifier (PEI).

16. The apparatus of claim 10, wherein each of the UL GTP-U TEID, the DL GTP-U TEID, and the first GTP-U TEID is a GTP-U TEID from an access side of a user plane function (UPF).

17. The apparatus of claim 10, wherein each of the UL GTP-U TEID, the DL GTP-U TEID, and the first GTP-U TEID is a GTP-U TEID from a core side of a user plane function (UPF).

18. The apparatus of claim 10, wherein the programmed instructions further cause the processor to:
capture a third message transmitted over the user plane interface;
extract, from the third message, one of the UL GTP-U TEID or the DL GTP-U TEID, a first user plane internet protocol (IP) address, a second user plane IP address, an identifier of one of a user datagram protocol (UDP) or a transmission control protocol (TCP), a first user plane port, and a second user plane port;
capture a fourth message transmitted over the user plane interface;
extract, from the fourth message, the other of the UL GTP-U TEID or the DL GTP-U TEID, the first user plane internet protocol (IP) address, the second user plane IP address, the identifier of one of a user datagram protocol (UDP) or a transmission control protocol (TCP), the first user plane port, and the second user plane port; and
determine that the UL GTP-U TED and the DL GTP-U TEID are associated with a same tunnel based on the first user plane internet protocol (IP) address, the second user plane IP address, the identifier of one of a user datagram protocol (UDP) or a transmission control protocol (TCP), the first user plane port, and the second user plane port being the same in the third and fourth message.

19. A method comprising:
capturing a first message over a packet forwarding control protocol (PFCP) interface;
extracting (a) a permanent ID from the first message, (b) an uplink (UL) general packet radio service (GPRS) tunneling protocol (GTP)-user plane (U) tunnel endpoint identifier (TED) from a packet detection rule (PDR) from the first message, and (c) a downlink (DL) GTP-U TEID from a forwarding action rule (FAR) from the first message;
storing the permanent ID, the UL GTP-U TEID, and the DL GTP-U TEID in a PFCP protocol data unit (PDU) session record;
storing the permanent ID in a session details record;
capturing a second message transmitted over a user plane interface after the first message is transmitted;
extracting a first GTP-U TED from the second message; and
retrieving the session details record using the first GTP-U TEID by retrieving the permanent ID from the PFCP PDU session record using the first GTP-U TEID and retrieving the session details record associated with the permanent ID.

20. The method of claim 19, wherein the session details record include two or more of network information, session information, user information, or a user location, wherein the network information includes one or more of a client internet protocol (IP) address, a service IP address, a service/data network name (DNN), the session information includes one or more of the DNN, a radio access technology (RAT) type, or a quality of service (QoS), the user information includes one or more of a subscriber permanent identifier (SUPI), an international mobile subscriber identity (IMSI), a permanent equipment identifier (PEI), a general public subscription identifier (GPSI), subscriber IP addresses, a mobile subscriber international integrated services digital network (MSISDN) number, or a mobile equipment identity (MEI), and the user location includes a public land mobile network (PLMN).

\* \* \* \* \*